W. C. KELSO.
LOAD BINDER.
APPLICATION FILED FEB. 25, 1913.
1,085,268.
Patented Jan. 27, 1914.
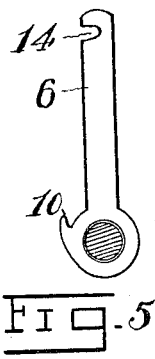
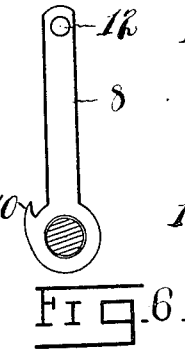
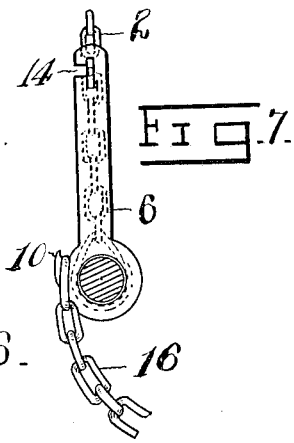
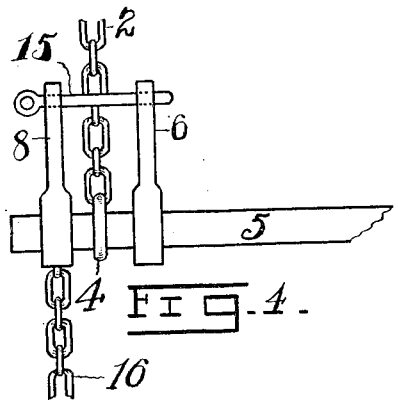
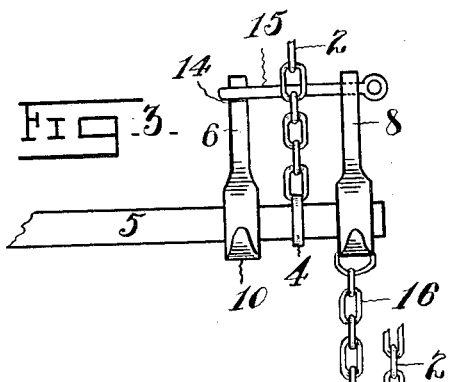
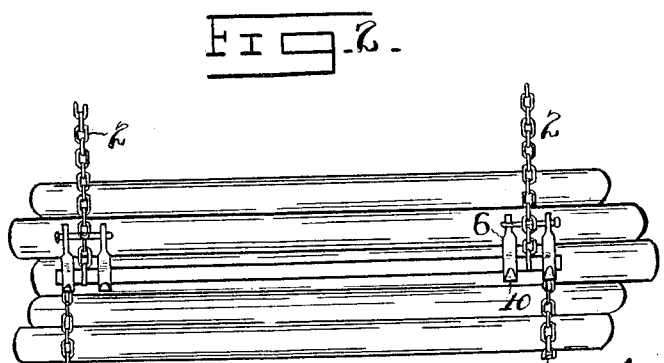
Witnesses
B. M. Henschel
M. C. Fisher
Inventor
Walter C. Kelso
By M. M. Cady
Attorney

UNITED STATES PATENT OFFICE.

WALTER C. KELSO, OF BELLEVUE, IOWA.

LOAD-BINDER.

1,085,268.  Specification of Letters Patent.  Patented Jan. 27, 1914.

Application filed February 25, 1913. Serial No. 750,622.

*To all whom it may concern:*

Be it known that I, WALTER C. KELSO, a citizen of the United States, residing at Bellevue, in the county of Jackson and State of Iowa, have invented certain new and useful Improvements in Load-Binders, of which the following is a specification.

My invention relates to load binders and the object is to provide means whereby the loading and unloading may be accomplished speedily, easily and without danger to the operator, and also to provide means for preventing the binding chains from becoming entangled with the logs when the load is spilled or unloaded, with special reference for use in connection with a system for logging such as is set out in my application filed Aug. 12, 1912, and numbered 714,683.

In what it consists, its mode of construction and manner of operation will be fully set out in detail in the following specification when taken and considered in connection with the drawings accompanying the same and forming a part hereof.

Figure 1 shows an end view of a number of logs with the chain around the logs and my device secured thereon. Fig. 2 is a side view of the logs with the chain in position together with the shaft and the pin for holding the shaft. Fig. 3 is an enlarged front view of the arms as attached on the shaft and the two chains in position when surrounding the load. Fig. 4 is the same as Fig. 3 but with a rear view of the arms. Fig. 5 is a side view of one of the arms. Fig. 6 shows a side view of the other arm on the end of the shaft. Fig. 7 is a side view of one of the arms with the chains as attached to a load. Fig. 8 is a side view of the same arm as in Fig. 7, but when the load is released.

Like characters of references denote corresponding parts in each of the figures.

Having reference to the drawings 2 is one of the chains which is attached to the car (not shown) and extends down and terminates in a ring 4 which ring is loosely engaged by a shaft 5. One of these chains is attached near each end of the load. On each end of the shaft 5 is rigidly secured two arms 6 and 8, these arms 6 and 8 are each provided with a hook 10 and the arm 8 is also provided with an opening 212 near the top and in the arm 6 near the top is a slot 14. Through the opening 12 and in the slot 14 is inserted a binding pin 15. There is also a second binding chain 16 that is attached at one end to a hoisting device (not shown) and passes around under the logs and engages the hook 10 on the shaft 8.

The manner in which my device is assembled and operates is substantially as follows: Starting with the chain 2 in position as shown in Fig. 4 with the pin 15 in engagement with the opening 12 and the slot 14 and the chain hanging against the pin 15 or the pin 15 may be inserted through the chain 2, if desired, the operator brings the chains 16 around the logs into engagement with one of the hooks 10 on either arm 6 or 8 and then the hoisting machine draws up the chains until they are taut around the load and raises the logs at both ends from off the ground. When the load has been carried to its destination and is in position to be unloaded, the operator inserts a hook attached to the end of a hand chain in the eye of the pin and by so jerking the chain that its weight adds force to the jerk, easily draws out the pin 15 from the slot and opening 12, and since the chains 16 are in engagement with the hooks 10 on one side of these arms the arms will be brought over into the position shown in Fig. 8, and the chains disengaged from the hooks 10, and the load will be released. As the pairs of arms 6 and 8 are rigid on the shaft 5, the chains at both ends are simultaneously released when the pin 15 is drawn from the opening 12. It cannot foul as all the arms are thrown forward immediately upon the drawing out of the pin by the weight of the load upon the hooks, thus making a sure delivery of the load. It will be observed unless the load is exceedingly heavy there is no necessity for a pin through each set of arms at the ends of the shaft 5, and also no necessity for an opening 12 in the arm 6 so that when the pin is inserted in the opening 12, it will be caught in the slot 14 as soon as the chain 2 becomes taut.

In handling logs, if the shaft 5 is placed as shown in Fig. 1, somewhat higher than the bottom of the log, it is evident that when the chain 16 is suddenly released from the shaft 5 that the shaft will be thrown away from the logs and be sustained from falling under them and that the weight and spreading of the logs will sweep the chain 16 from under and out of the way of the falling logs, so that no trouble will be experienced in extricating the shaft or chains from the logs when the logs are spilled on the ground, but all of this may be regulated and adjusted by raising or lowering the shaft 5 along the line of the chains 2 and 16.

Having now described my invention what I claim is:—

1. In a device of the character described, a shaft, arms rigidly fixed to the shaft and provided with openings in their outer ends, a cable loosely attached to the shaft, a cable adapted to be brought under the load and removably attached to one of the arms on the shaft, and a pin adapted to removably engage the opening in the arm and lock the rotation of the shaft and when said pin is withdrawn to permit the weight of the logs to automatically dump the load.

2. In a device of the character described, a shaft, arms rigidly secured to the shaft and each provided with an opening at their outer ends, a hook on the arms, a cable loosely attached to the shaft between the arms, a cable adapted to be brought under the load and into engagement with a hook on the arms, and a pin adapted to removably engage the opening in the arms and hold one of the cables between the arms and when withdrawn to release the chain and permit the load to be automatically dumped.

3. In a device of the character described, a shaft, a plurality of arms rigidly fixed to the shaft at both ends and each arm provided with an opening in its outer end, a pin adapted to removably engage the openings in the arms, a chain loosely attached to the shaft at each end between the arms, and cable adapted to removably engage one of the arms at each end of the shaft.

4. In a device of the character described, a shaft, a pair of arms rigidly attached at each end of the shaft and each arm provided with an opening near its outer end, a hook on the lower portions of the arms, a cable loosely attached between the arms at each end of the shaft, a pin adapted to engage the openings in the arms and hold the cable between the arms and a chain engaging the hook upon an arm at each end of the shaft.

5. In a device of the character described, a shaft, a pair of arms set a short distance apart and rigidly secured near each end of the shaft and each arm provided with an opening near its outer end, a hook on the arms, a pin adapted to be inserted in the openings in the arms, a cable loosely secured to the shaft between each pair of arms and adapted to be retained between the arms by the pin when the load is bound by the cables, and a cable at each end secured to the hoist and brought into removable engagement with the hook on the arms and automatically released from the hooks when the pin is withdrawn from the opening in the arms.

In testimony whereof I affix my signature in presence of two witnesses.

WALTER C. KELSO.

Witnesses:
GEO. SCHLATTER,
MAGGIE KELSO.

Copies of this patent may be obtained for five cents each, by addressing the "Commissioner of Patents, Washington, D. C."